United States Patent Office 3,813,273
Patented May 28, 1974

---

3,813,273
METHOD FOR CONSTRUCTING A HONEYCOMB STRUCTURE AND A DEVICE FOR CARRYING OUT SAID METHOD
Jean Loustau, 59 Avenue de Suffren, Paris 7eme, France
Filed Feb. 7, 1972, Ser. No. 224,102
Claims priority, application France, Feb. 10, 1971, 7104447; Apr. 4, 1971, 7116043
Int. Cl. B31f *1/00*
U.S. Cl. 156—469    2 Claims

ABSTRACT OF THE DISCLOSURE

A method for constructing a honeycomb structure, comprising employing parallel lines of fixed abutments alternating with lines of movable punches which are parallel to each other and parallel to the lines of abutment and have an active face facing the active faces of the fixed abutment which face them in an adjacent line and a face facing the gap between the two fixed abutments of the other adjacent line of abutments, the lines of each kind carrying on said facing faces at least one longitudinal component element of the structure, moving the lines of movable punches toward the lines of fixed abutments in a direction perpendicular to the lines of punches and abutments until said component elements are united in the surface common to the facing faces, interconnecting the component elements in said common surface and separating the structure obtained from the abutments and punches.

---

Honeycomb structures constituted by polygons joined together along a common side are of very high industrial interest owing to the great strength they possess relative to the lightness of the material employed.

However, their construction gives rise to very great difficulties which limit their possibilities of utilization and the dimensions of the structures obtained.

At the present time, they are in fact constructed by taking a plane sheet which is first corrugated so as to form adjacent semi-polygons and then joined to a similar sheet and so on, step by step. In practice, this process does not allow high rates of production since a temperature rise is usually required to permit the folding and then the welding of each sheet. Further, the product thus manufactured must be cut in a direction perpendicular to the planes of the sheets to obtain the desired thickness of the honeycomb structure.

An object of the invention is to provide a production method which does not have these drawbacks. In particular, the method according to the invention permits mass-production, and consequently a low cost production, and it allows the production of the exact thickness desired of the honeycomb structure without requiring any cutting.

The invention provides a method for constructing a honeycomb structure comprising employing parallel lines of fixed abutments alternating with lines of movable punches which are parallel to each other and parallel to said lines of abutments and have an active face facing the active faces of the fixed abutments which face them in an adjacent line and a face facing the gap between the two fixed abutments of the other adjacent line of abutments, the lines of each type carrying on said facing faces at least one longitudinal component element of the structure, moving the lines of movable punches toward the lines of fixed abutments in a direction perpendicular to the lines of punches and of abutments until said component elements are united on the surface common to the facing faces interconnecting the component elements on said common surface and separating the structures obtained from the abutments and punches.

The invention will be understood with reference to the ensuing description given by way of non limitative example with reference to the accompanying drawings in which:

FIG. 1 shows at 1, 1', 1" . . . the successive lines of fixed abutments 2 and at 3, 3', 3" . . . the successive lines of movable punches 4.

Figure 1:
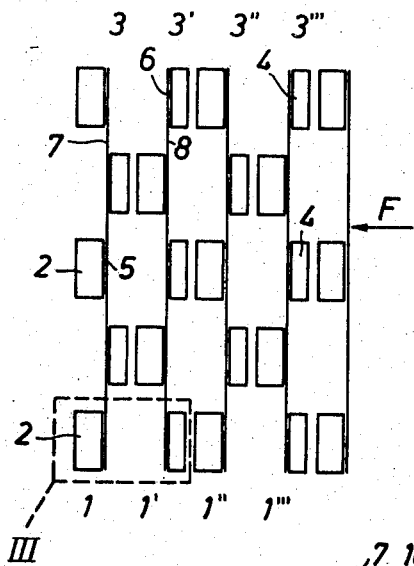
FIG. 1 is a diagrammatic plan view of a device for carrying out the method according to the invention in one position of the device.

As can be seen, the lines 1 and 3 are alternating relation, two adjacent lines 1 and 3 having elements 2 and 4 facing each other or in the middle of the gap between the elements of the adjacent line.

The elements 2 and 4 which face each other in two adjacent lines 1 and 3 have their active faces, respectively 5 and 6, facing each other and of the same size. The lines 1 of abutments carry along their active faces 5 a longitudinal component element 7 of the structure to be constructed. The composition of this element 7 will be explained hereinafter. Further, the lines 3 of punches carry along their active faces 6 a longitudinal element 8 similar to the element 7.

Figure 2:
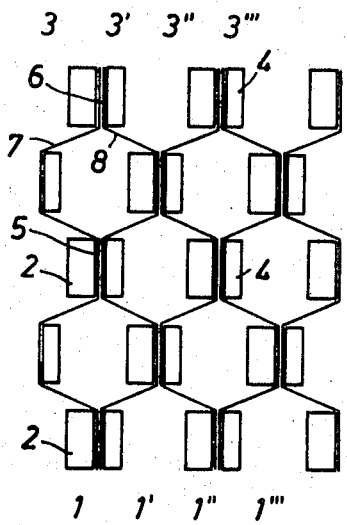
FIG. 2 is identical to FIG. 1 in respect of another position of the device.

According to the method of the invention, the punches 4 are made to move in a direction parallel to the arrow F until positions of abutment are reached between the active faces 5 and 6 and the elements 7 and 8, as shown in FIG. 2.

The longitudinal elements 7 and 8 are united between the faces 5 and 6 of each fixed abutment 2 and each punch 4 and interconnected by any suitable means in this position. Thereafter, the punches 4 are withdrawn, for example to their position shown in FIG. 1, and means are provided for stripping the constructed structure. In the illustrated embodiment, the structure will have hexagonal elements. Any other shape, which may be regular or irregular, may be obtained by a different relative disposition of the elements 2 and 4 which do not face each other.

The longitudinal elements 7 and 8 can be of any type and possibly different. Advantageously, they are constituted by strips or bands whose width is equal to the desired thickness of the honeycomb structure. For example, it is possible to employ a woven band of glass threads which may be crimped. In this case, threads in various directions will be obtained. It is also possible to start with single glass threads and, by extrusion, embed them continuously in parallel relation in a band of thermoplastic or thermosetting material. Tubes may also be employed.

It will be understood that any other material may be employed, such as plastic materials, mineral materials (asbestoses . . .), cloth materials (linen, cork, cotton, etc.) or metallic materials (sheets of iron, aluminium, etc.). When the fixed abutment and movable punches have brought the elements 7 and 8 together, they can be interconnected by any suitable means, depending on the materials employed. For example, they can be interconnected by adhesion, welding, polymerization, catalysis, weaving, riveting, etc. If heating means are employed for the connection, they are advantageously provided in the fixed abutment 2 and/or the movable punches 4. The structures may be employed in the state in which they come from the device or be partly or completely filled with any suitable material.

Figure 3:
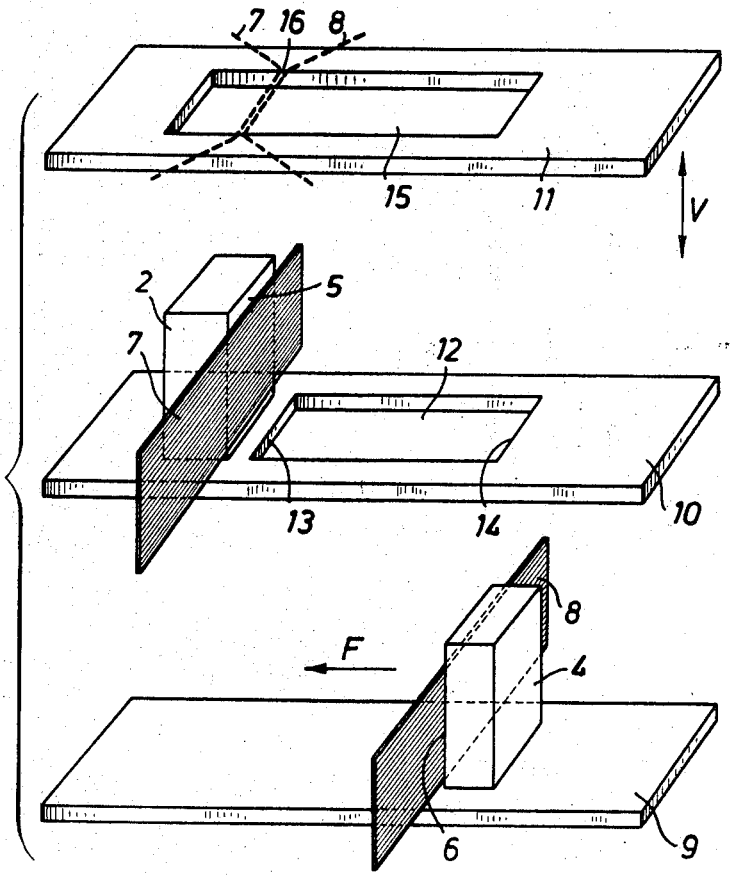
FIG. 3 is a diagrammatic perspective view of one embodiment of the device according to the invention, in respect of a portion III of FIG. 1, the component elements having been moved apart for purposes of clarification.

FIG. 3 shows a device for carrying out the method according to the invention. The parts have been spread apart for reasons of clarity and only a portion of the device has been shown, namely the portion indicated by the rectangle III in FIG. 1.

The device comprises a lower plate 9 carrying the movable punches 4, an intermediate plate 10 carrying the fixed abutment 2, and an upper or stripping plate 11 whose function will be explained hereinafter.

The plate 9 is capable of sliding in a direction parallel to the arrow F, the plate 10 having rectangular openings 12 for the passage of the punches 4. The faces 13 and 14 of the openings 12 limit the displacement of the punches 4 and consequently of the plate 9. As shown diagrammatically, the active faces 5 of the abutments 2 carry, in respect of each row of abutments, a longitudinal strip 7 and the punches 4 carry, in respect of each row, a strip 9 on the active faces 6.

The upper plate 11 is slidable in a direction perpendicular to the planes of the plates 9, 10, 11 in the direction of the double arrow V for stripping the honeycomb structure when it has been constructed. For this purpose, the plate 11 has openings 15, similar to the openings 12 in the plate 10 but of greater length, for the passage of the fixed abutments 2.

The device operates in the following manner:

The plates 9 and 10 are very close to each other, a clearance being provided however to allow the sliding of the plate 9. The plate 11 is tight against the plate 10. In the illustrated position, which corresponds to that of FIG. 1, the strips 7 and 8 (or possibly the parallel threads or filaments) are held taut on the lines of abutments and punches respectively. A movement of the plate 9 in a direction parallel to the arrow F brings the face 6 of the punch 4 into abutment with the face 13 of the opening 12. The faces 5 and 6 of the abutments 2 and punches 4 respectively are practically in contact with each other, the distance therebetween being calculated to allow the assembly of the strips 7 and 8 between the faces 5 and 6. The assembled faces of the strips 7 and 8 are then interconnected for example by heating the abutment 2 and/or the punch 4 and then the plate 9 is returned to its first position.

The plate 11 is then raised vertically and it carries along therewith the structure consisting of the folded and interconnected strips 7 and 8 by exerting a pressure under the junctions 16 which are formed outside the opening 15 owing to the semi-stiffness of the strips or bands.

In this way any deformation of the structure is avoided, the structure often being, when stripped, in a semi-flexible condition. This is in particular the case with structures of glass fibres which are heated for folding and adhesion and when it is desired to strip the structure before complete cooling.

The embodiment shown in FIGS. 4 to 7 is particularly suitable for strips and abutments having a particularly high relative coefficient of friction. In a preferred embodiment, this embodiment allows a continuous production of the strips on the abutments, without sliding.

Indeed, if all the lines of movable punches are shifted so as to move them toward the fixed abutments (the embodiment shown in FIGS. 1 to 3) a honeycomb structure is constructed which employs a length of strip which is distinctly greater than that which was carried by each line before shifting the punches toward the abutments. The additional length, which may in some cases greatly exceed the initial length, is obtained by the sliding of the strip on the abutments and the unwinding of the strip from its supply reel in respect of each line. Difficulty in sliding is rapidly reached when the length of the honeycomb structure to be obtained becomes great. Note, moreover, that the sliding of the strip on each abutment is accumulative, whereas the unwinding occurs from only one side and this introduces a lack of symmetry in the whole which is difficult to allow.

In any case, if the strip can slide along the abutment only small amounts or even not at all, which would often be the case with strips coated at high temperature or semi-rigid strips, the displacement of the lines of punches can no longer allow a suitable feeding of the strips.

Figure 4:
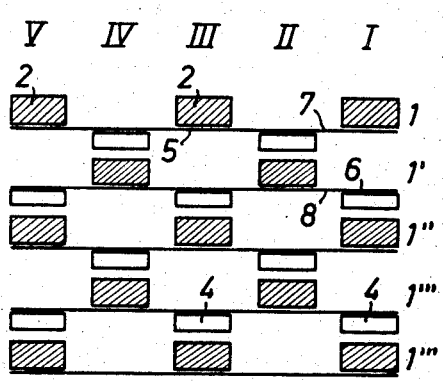
FIG. 4 is a diagrammatic plan view similar to FIG. 1.

FIG. 4 shows lines 1, 1', 1'' . . . of fixed abutments 2. The movable punches 4 are arranged lines 3, 3', 3'' . . . (before displacement of the punches) and in columns I, II, III. . . . Strips 7 and 8 alternate between the lines of punches and abutments.

Figure 5:
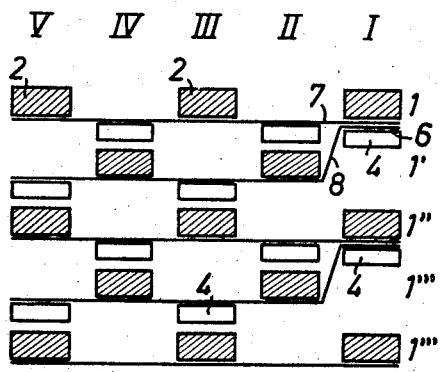
FIG. 5 is similar to FIG. 4, for another position of the device.

In FIG. 5, there is shown the position assumed by the assembly after displacement of the punches 4 of column I. The portion of the strip 8 between the columns I and II has become oblique and has assumed the position that it will have in the finished honeycomb structure. The additional length required due to the fact that the strip has been into an oblique position is obtained by pulling on the strip on the left of column II (as viewed in FIG. 4), since the part on the right of column I is inserted in the already formed structure and is consequently locked in position by the columns of punches which have already been shifted. As will be understood, the strips 8 are unwound from their reel (not shown) a small amount, and the strips rub in the course of their unwinding only along the edge of the corresponding abutment 2 in column II.

Thus the strip is always unwound an equal amount for each displacement of a column of punches and the rubbing is very small.

To apply this modification of the method, there can be employed a plate carrying the fixed abutment whereas the punches are manufactured in columns which are displaced one after the other.

It is also possible to construct the fixed abutments in columns advantageously identical to the columns of punches so as to afford a universal device which is very simple to operate.

Figure 6:
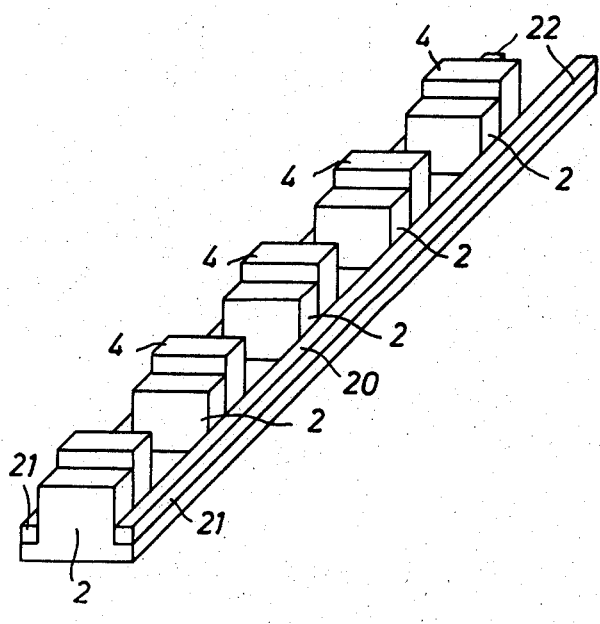
FIG. 6 is a perspective view of the device shown in FIGS. 4 and 5.

With reference to FIG. 6, which shows the combination of a column 20 of punches 4 and a column 21 of fixed abutments 2, a column 20 or a column 21 is constructed in the form of a ladder-like structure, that is, it has two longitudinal members 22 between which the abutments or the punches extend. The punches are displaced relative to the abutments by sliding the longitudinal members 22 of the column 20 of punches along the longitudinal members 22 of the column 21 of abutments.

Figure 7:
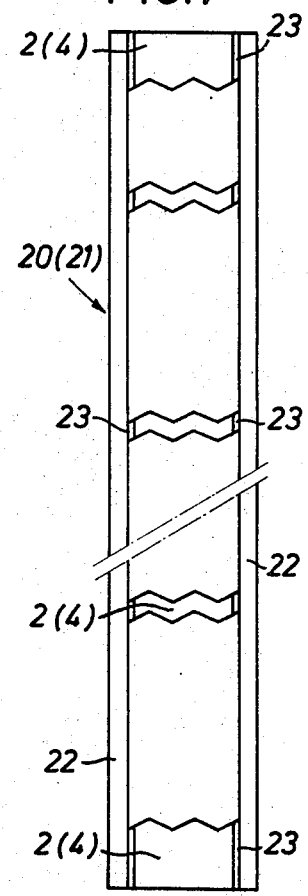
FIG. 7 is a plan view of a component of the device shown in FIG. 6.

FIG. 7 is a plan view of a ladder-like structure which can be used indifferently as a column of abutments or a column of punches.

The longitudinal members 22 have extending therebetween the abutments 2 (or punches 4 indifferently). The abutments 2 have, where they are attached to the members 22, a recess 23 which facilitates the fitting together of two ladder-like structures. Advantageously and as shown, the abutments 2 have a zig-zag profile which ensures an intimate contact of their two strips when they are brought together. Further, the honeycomb structure obtained will have an improved compressive strength in the direction perpendicular to its face and the face in relief may be employed for forming the strips by means of heat. The ladder-like structure is symmetrical so as to be capable of being employed indifferently as a column of abutments or a column of punches, the spacing between the last two abutments at one end of a ladder-like structure being one half of the normal spacing whereas the spacing between the last two abutments at the other end is equal to the normal spacing.

In the case where the abutment columns are independent, they may be fixed relative to each other and thus constitute the equivalent of an abutment plate.

On the other hand, they may be independent from each other. If the strips are prevented from sliding on the abutment by a clamping device (not shown) acting on the abutment, the bringing together of the punches of one column and the abutments of the corresponding column will result in a bringing together of the immediately adjacent columns of abutments and punches. The columns being guided in the perpendicular direction. This bringing together will result in a corresponding unwinding of the strip 8. In FIG. 5, the colunm II will move toward column I and the original gap will no longer be final gap. If the punches have also been provided with a device for clamping the strip 7, the latter will also be unwound in the course of the movement of column I toward column II and the portion between the columns will be slightly folded so as to absorb the excess length given thereto. In the course of the following movement, the punches of column II move toward the corresponding abutments and this excess length will be absorbed. The column III in the course of the cycle moves toward the column II and the construction continues.

It will be observed that in the latter embodiment, only three columns are active, namely the column on the extreme right side (not shown in FIG. 5) which has just been brought to its clamping position, the column I in the course of being clamped, and the column II which moves toward the column I. Thus it is possible to construct the honeycomb structure in a continuous manner without sliding of the strips by employing a limited number of columns, and a minimum of three columns, the column which has been brought to its clamping position being returned, after unclamping, after the columns which followed it.

What I claim is:

1. In an apparatus for making a honeycomb structure from a tape having a means for moving the tape through the apparatus and a means for moving a plurality of punches perpendicularly to the longitudinal axis of the tape, a plurality of parallel cooperating abutment and punch assemblies, each assembly comprising a moveable lower plate carrying a punch, an intermediate plate having a rectangular opening therethrough disposed in slidable relation over the lower plate with the said punch being disposed in the opening, said intermediate plate having an abutment fixed thereto adjacent to one end of the rectangular opening, and a top plate disposed on the intermediate plate having a rectangular opening through which the abutment and punch extend, the length of the opening in the top plate being great enough for the opening to be disposed simultaneously about the abutment and the punch in all positions of the punch in the opening in the intermediate plate, said top plate being moveable vertical from the intermediate plate.

2. An apparatus for making a honeycomb structure from tapes comprising a first pair of laterally spaced longitudinally extending support members, a plurality of longitudinally spaced punches carried by the said support members, a second pair of laterally spaced longitudinally extending support members, a plurality of longitudinally spaced abutments carried by the second pair of support members, said first and second support members being assembled with the punches of one and the abutments of the other slidably disposed over each other, means for moving two tapes between a punch and an abutment, and means for moving the punches relative to abutments whereby the punches and abutments cooperate to join the tapes together in face to face relationship.

References Cited
UNITED STATES PATENTS

| | | | |
|---|---|---|---|
| 2,624,390 | 1/1953 | Groat | 156—210 X |
| 2,547,880 | 4/1951 | Meyer et al. | 156—201 |
| 3,676,263 | 7/1972 | Tisdale | 156—462 |

DOUGLAS J. DRUMMOND, Primary Examiner

B. J. LEWRIS, Assistant Examiner

U.S. Cl. X.R.

156—201, 470